(12) United States Patent
Najafi et al.

(10) Patent No.: US 12,741,868 B2
(45) Date of Patent: Sep. 22, 2026

(54) REACTOR AND RELATED SYSTEMS AND METHODS FOR FUEL GAS PRODUCTION

(71) Applicant: InnoTech Alberta Inc., Edmonton (CA)

(72) Inventors: Aref Najafi, Calgary (CA); Volodymyr Chernyak, Calgary (CA); Farbod Sharif, Calgary (CA)

(73) Assignee: InnoTech Alberta Inc., Edmonton (CA)

( * ) Notice: Subject to any disclaimer, the term of this patent is extended or adjusted under 35 U.S.C. 154(b) by 616 days.

(21) Appl. No.: 18/299,254

(22) Filed: Apr. 12, 2023

(65) Prior Publication Data

US 2023/0322552 A1 Oct. 12, 2023

Related U.S. Application Data

(60) Provisional application No. 63/329,958, filed on Apr. 12, 2022.

(51) Int. Cl.
*B01J 19/24* (2006.01)
*B01J 19/00* (2006.01)
(Continued)

(52) U.S. Cl.
CPC ............ *C01B 3/34* (2013.01); *B01J 19/0053* (2013.01); *B01J 19/244* (2013.01); *C01B 3/24* (2013.01);
(Continued)

(58) Field of Classification Search
CPC .. B01J 19/2415; B01J 19/244; B01J 19/0013; B01J 19/0053; B01J 2219/0002;
(Continued)

(56) References Cited

U.S. PATENT DOCUMENTS 5,260,538 A * 11/1993 Clary .................... B01J 8/1836 219/628
5,932,181 A * 8/1999 Kim ...................... B01D 53/48 422/204
(Continued)

FOREIGN PATENT DOCUMENTS

CN 111100685 5/2020
JP 2003-206102 A 7/2003
(Continued)

OTHER PUBLICATIONS

Machine Translation of JP 2003-2006102A (Year: 2003).*

*Primary Examiner* — Lessanework Seifu
(74) *Attorney, Agent, or Firm* — CHRISTENSEN O'CONNOR JOHNSON KINDNESS PLLC

(57) ABSTRACT

Reactors and systems for producing fuel gases are provided herein. In some embodiments, the reactor comprises: an outer sleeve, and inner reaction tube received within the outer sleeve, and an induction heater comprising an induction coil wrapped around the outer sleeve, wherein the induction coil is approximately the same length as the inner reaction tube and longitudinally aligned with the inner reaction tube. Systems including the reactor can be modular such that they can be installed on site at fuel stations and other locations. Related methods for making a fuel gas are also provided.

19 Claims, 11 Drawing Sheets

(51) Int. Cl.
*C01B 3/24* (2006.01)
*C01B 3/34* (2006.01)

(52) U.S. Cl.
CPC ................. *B01J 2208/00433* (2013.01); *B01J 2219/00083* (2013.01); *B01J 2219/00132* (2013.01); *B01J 2219/00822* (2013.01); *B01J 2219/00826* (2013.01); *C01B 2203/0272* (2013.01); *C01B 2203/04* (2013.01); *C01B 2203/0855* (2013.01); *C01B 2203/1241* (2013.01)

(58) Field of Classification Search
CPC ...... B01J 2219/0009; B01J 2219/00083; B01J 2219/00132; B01J 2219/0272; B01J 2219/0277; C01B 3/24; C01B 3/34
See application file for complete search history.

(56) References Cited

U.S. PATENT DOCUMENTS

| | | | | |
|---|---|---|---|---|
| 6,653,005 | B1 * | 11/2003 | Muradov | B01J 8/0496 429/479 |
| 9,561,957 | B2 | 2/2017 | Hammel et al. | |
| 10,486,967 | B2 | 11/2019 | Isobe et al. | |
| 11,167,732 | B1 | 11/2021 | Cohen et al. | |
| 2008/0241614 | A1 * | 10/2008 | McCanney | B60L 58/40 429/411 |
| 2009/0304574 | A1 | 12/2009 | Ravikumar | |

FOREIGN PATENT DOCUMENTS

| | | |
|---|---|---|
| WO | WO 2019/031966 | 2/2019 |
| WO | WO 2021/195566 | 9/2021 |

* cited by examiner

REACTOR AND RELATED SYSTEMS AND METHODS FOR FUEL GAS PRODUCTION

RELATED APPLICATION

The present application claims priority to U.S. Provisional Patent Application No. 63/329,958 filed Apr. 12, 2022, the entire contents of which are incorporated herein by reference.

TECHNICAL FIELD

The present disclosure relates to production of fuels. More particularly, the present disclosure relates to reactors and related systems and methods for production of fuel gases.

BACKGROUND

A number of alternatives to fossil fuels have been investigated, including fuel gases such as hydrogen ($H_2$) and synthesis gas ("syngas"). Hydrogen is one of the most promising energy carriers, and one of the cleanest fuels, since its combustion generates more energy per kg of fuel than traditional fossil fuels while its combustion product is only water. Hydrogen can be used as a fuel for fuels cells and internal combustions engines.

Today, almost all industrial-scale hydrogen production uses Steam Methane Reforming (SMR) technology. SMR technology converts methane to hydrogen gas in the presence of steam and a catalyst. However, conversion rates decrease with catalyst life and there are costs associated with catalyst replacement or regeneration.

Conventional SMR-based systems are large-scale centralized facilities that require large capital and operational costs. In addition, carbon dioxide ($CO_2$) is produced as a waste product of the steam reforming process and, thus, SMR facilities require $CO_2$ management systems such as $CO_2$ capture and storage technologies. Moreover, hydrogen is typically transported from the centralized facility to distribution centers using ammonia as a hydrogen carrier, which is both toxic and potentially explosive. The distribution center also requires an ammonia cracking plant to crack the ammonia into pure hydrogen for use.

SUMMARY

In one aspect, there is provided a reactor for producing a fuel gas, comprising: an outer sleeve having a first end and a second end, the outer sleeve defining an internal chamber therein; an inner reaction tube disposed within the internal chamber, the inner reaction tube being shorter than the outer sleeve and longitudinally recessed within the internal chamber from the first end and the second end of the outer sleeve, wherein the inner reaction tube and the outer sleeve define an annular space therebetween; and an induction heater comprising an induction coil, the induction coil wrapped around the outer sleeve, wherein the induction coil is approximately the same length as the inner reaction tube and longitudinally aligned with the inner reaction tube.

In some embodiments, the inner reaction tube is coaxial with the outer sleeve.

In some embodiments, the first end is an inlet end and the second end is an outlet end, and wherein the internal chamber defines a feed zone between the inlet end and the inner reaction tube, and a product zone between the inner reaction tube and the outlet end.

In some embodiments, insulating material is disposed within the annular space.

In some embodiments, the insulating material comprises alumina paper, ceramic wool, high temperature insulation board, or microporous silica-based insulating material.

In some embodiments, the outer sleeve is comprised of quartz.

In some embodiments, the inner reaction tube is comprised of graphite or tantalum.

In some embodiments, the reactor is horizontally oriented.

In another aspect, there is provided a system comprising: any embodiment of the reactor disclosed herein to convert a feed gas to a fuel gas; at least one of a gas-solid separator and a gas separator to purify the fuel gas; wherein the system is modular and can be transported and installed on site.

In some embodiments, the reactor is fluidly connectable to a utility natural gas line or a natural gas storage container.

In some embodiments, the reactor is operatively connectable to a low-carbon power source.

In some embodiments, the system further comprises a fuel pump to dispense the fuel gas.

In some embodiments, the system further comprises a compressor to compress the fuel gas.

In some embodiments, the system further comprises a heat exchanger to recover heat from the fuel gas.

In another aspect, there is provided a method comprising: introducing a feed gas into any embodiment of the reactor disclosed herein; flowing the feed gas through the inner reaction tube; and heating, via the induction heater, the inner reaction tube to a temperature to cause a reaction of the feed gas.

In some embodiments, the method further comprises collecting a reaction product mixture.

In some embodiments, the feed gas comprises a light hydrocarbon and the reaction product mixture comprises hydrogen and elemental carbon.

In some embodiments, the feed gas comprises methane and carbon dioxide and the reaction product mixture comprises syngas.

In some embodiments, the feed gas comprises about 50% methane and about 50% carbon dioxide.

In some embodiments, the inner reaction tube is heated to between about 1200° C. and about 1400° C.

Other aspects and features of the present disclosure will become apparent, to those ordinarily skilled in the art, upon review of the following description of specific embodiments of the disclosure.

BRIEF DESCRIPTION OF THE DRAWINGS

Some aspects of the disclosure will now be described in greater detail with reference to the accompanying drawings. In the drawings.

DETAILED DESCRIPTION

Figure 1:
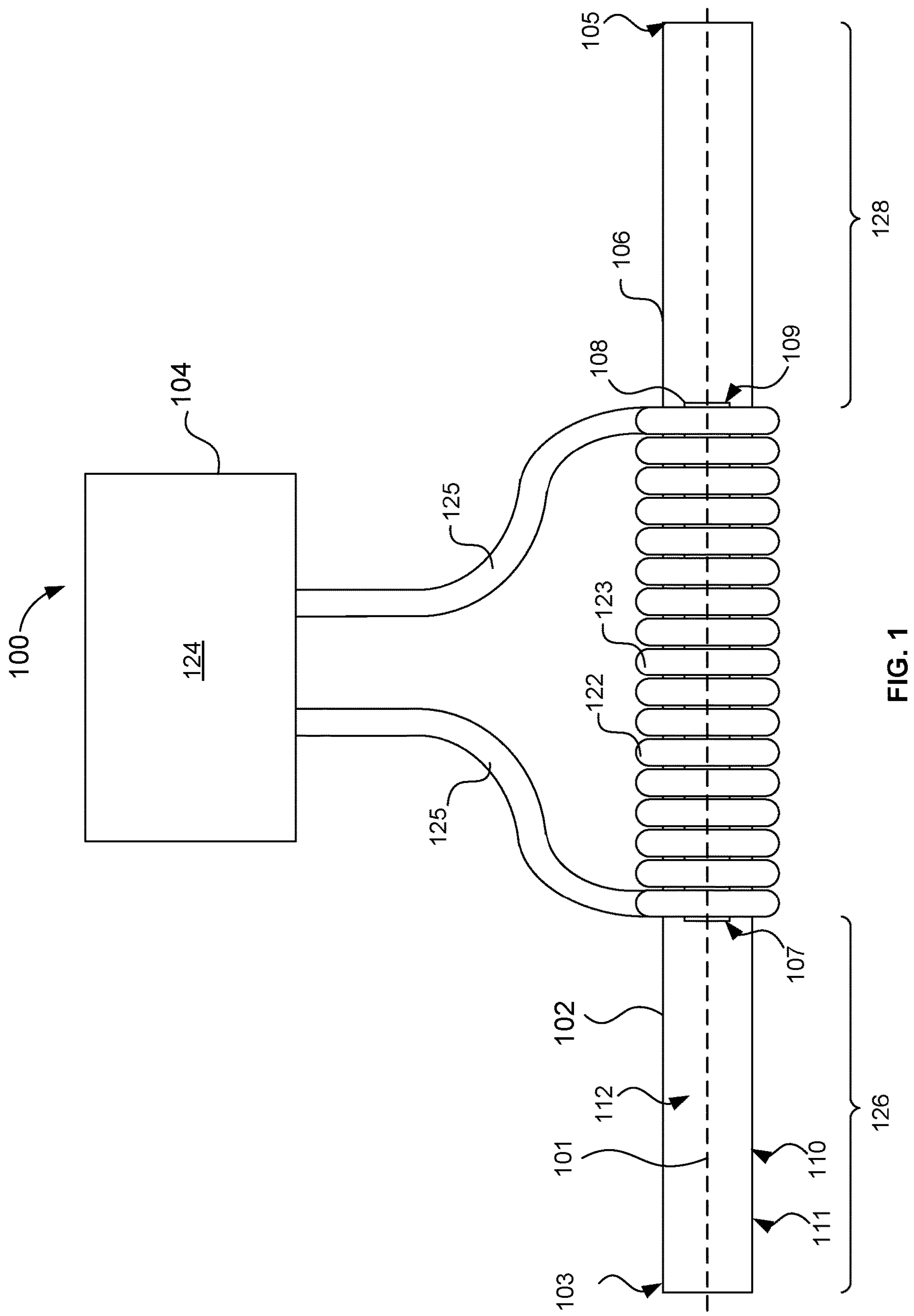
FIG. 1 is a top view of an example reactor, according to some embodiments.

Generally, the present disclosure provides reactors and systems for producing fuel gases. In some embodiments, the reactor comprises an outer sleeve, and inner reaction tube received within the outer sleeve, and an induction heater comprising an induction coil wrapped around the outer sleeve. Systems including the reactor can be modular such that they can be installed on site at fuel stations and other locations. Related methods for making a fuel gas are also provided.

As used herein the terms "a," "an," and "the" may include plural referents unless the context clearly dictates otherwise.

As used herein, "upstream" and "downstream" refer to the direction of the flow of gases or other substances through embodiments of the reactors and systems described herein. Under normal operating conditions, gases and other substances flow from an upstream position to a downstream position.

The systems and methods disclosed herein may be used to produce a fuel gas from a feed gas. As used herein, "fuel gas" refers to a fuel that is gaseous under normal conditions, although it will be understood that a fuel gas may be liquified under certain conditions, for example, for storage or transport. A "feed gas" may be any gas from which a fuel gas can be produced. The feed gas may be converted to the fuel gas by a suitable reaction. As used herein "reaction" refers to the conversion of a substance to a product, regardless of the process or mechanism used, and is inclusive of pyrolysis, reforming, and the like.

In some embodiments, the fuel gas comprises hydrogen ($H_2$). Hydrogen may be produced by pyrolysis of a feed gas. The terms "pyrolysis" and "thermal cracking" are used interchangeably herein to refer to thermal decomposition of a feed gas. The feed gas may comprise one or more light hydrocarbons such as a C1-C4 hydrocarbon. Non-limiting examples of light hydrocarbons include methane, ethane, propane, butane, and combinations thereof. In some embodiments, the feed gas comprises natural gas. As used herein, "natural gas" refers to a naturally occurring gas mixture, the largest component of which is methane. In these embodiments, pyrolysis of the feed gas will produce hydrogen and elemental carbon. As an example, methane is converted to hydrogen and carbon by the following reaction (I):

$$CH_4\text{->}C+2H_2 \quad (I)$$

In other embodiments, the fuel gas comprises synthetic gas ("syngas"). As used herein, "syngas" refers to a mixture of carbon monoxide (CO) and $H_2$ gases, although trace amounts of other gases may also be present. Syngas may be produced from a feed gas by dry methane reforming. In these embodiments, the feed gas comprises a mixture of methane and carbon dioxide ($CO_2$) such as, for example, a mixture of 50% methane and 50% $CO_2$. The feed gas mixture is converted to syngas by the following reaction (II):

$$CH_4+CO_2\text{->}2CO+2H_2 \quad (II)$$

Syngas can be used as a fuel itself or can be used to produce other useful substances including, but not limited to, hydrogen, diesel, or methanol.

In other embodiments, the reactors, systems, and methods disclosed herein may be used for any other suitable application and embodiments are not limited only to the production of the fuel gases described above.

An example reactor 100 will be discussed with reference to FIGS. 1 and 2. Of note, in FIG. 2, the reactor 100 is simplified and not shown to exact scale.

Referring to FIG. 1, the reactor 100 in this embodiment comprises a reactor body 102 and an induction heater 104. The reactor body 102 comprises an outer sleeve 106 and an inner reaction tube 108. In FIG. 1, the outer sleeve 106 is shown as transparent for illustrative purposes to view the inner reaction tube 108; however, it will be understood that the outer sleeve 106 may be opaque in some embodiments. The outer sleeve 106 may be comprised of quartz or any other suitable material.

The outer sleeve 106 extends along a longitudinal axis 101. In this embodiment, the reactor body 102 is horizontally oriented such that the longitudinal axis 101 is approximately horizontal. In other embodiments, the reactor body 102 may be vertically oriented or at any suitable angle between vertical and horizontal. As used herein, the terms "axial" and "longitudinal" are intended to refer to the approximate direction of the longitudinal axis 101.

The outer sleeve 106 has a first (inlet) end 103 and a second (outlet) end 105. The first end 103 of the outer sleeve 106 may comprise or engage a feed gas inlet (not shown) and the second end 105 may comprise or engage at least one product outlet (not shown). In some embodiments, the inlet end 103 may comprise an inlet tube (not shown), extending into the outer sleeve 106. In some embodiments, the product outlet includes a gas outlet and a solids outlet.

The outer sleeve 106 is generally tubular in shape and has an inner surface 110 and an outer surface 111. The inner surface 110 defines an internal chamber 112 therein that extends axially from the first end 103 to the second end of the outer sleeve 106.

The inner reaction tube 108 is disposed within the internal chamber 112. In this embodiment, the inner reaction tube 108 is coaxial with the outer sleeve 106 about the longitudinal axis 101. The inner reaction tube 108 has a first end 107 and a second end 109. The first end 107 and the second end 109 in this embodiment are "free" ends that do not contact any other component of the reactor 100. The inner reaction tube 108 is axially (longitudinally) shorter than the outer sleeve 106 and axially recessed from the first end 103 and the second end 105 of the outer sleeve 106, respectively. In this embodiment, the inner reaction tube 108 is approximately centered within the internal chamber 112 such that the first end 107 and the second end 109 are equidistant from the first end 103 and the second end 105 of the outer sleeve 106, respectively. In other embodiments, the inner reaction tube 108 may be shifted more towards the first end 103 or the second end 105 of the outer sleeve 106.

The internal chamber 112 comprises a "feed zone" 126 defined between the first end 103 of the outer sleeve 106 (or the inlet) to the first end 107 of the inner reaction tube 108 and a "product zone" 128 defined between the second end 109 of the inner reaction tube 108 and the second end 105 of the outer sleeve 106 (or the outlet).

Figure 2:
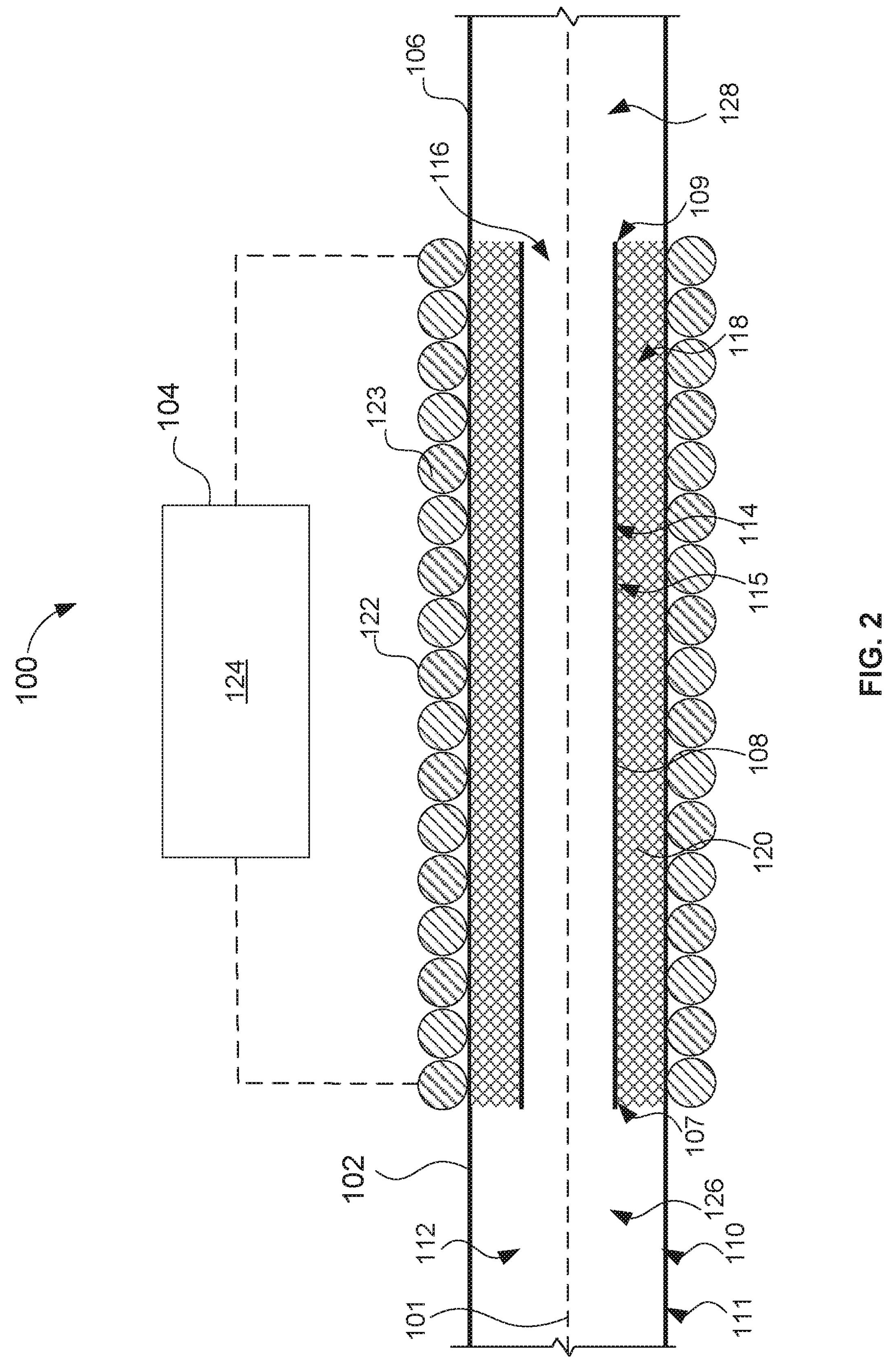
FIG. 2 is a partial, cross-sectional view of the example reactor of FIG. 1.

Referring now to FIG. 2, the inner reaction tube 108 has an inner surface 114 and an outer surface 115. The inner surface 114 defines an internal reaction chamber 116 that extends axially through the inner reaction tube 108 from the first end 107 to the second end 109. The inner reaction tube 108 is comprised of an electrically conductive material. In this embodiment, the inner reaction tube 108 is comprised of tantalum or graphite. In other embodiments, the inner reaction tube 108 may be comprised of tungsten, molybdenum, niobium, vanadium, titanium, carbon carbide or any other suitable electrically conductive material.

The inner reaction tube 108 has a smaller diameter than the outer sleeve 106 such that the outer surface 115 of the inner reaction tube 108 and the inner surface 110 of the outer sleeve 106 define an annular space 118 therebetween. In some embodiments, the diameter of the inner reaction tube 108 is less than half the diameter of the outer sleeve 106. In other embodiments, the inner reaction tube 108 is any other suitable diameter.

In this embodiment, an insulating material 120 is disposed within the annular space 118. The insulating material 120 may comprise a soft insulation material. The soft insulation material may be alumina paper as one example. Alternatively, the insulating material 120 may comprise ceramic wool, high temperature insulation board (comprising ceramic fibers and high alumina polycrystalline fibers, for example), or microporous (silica-based) insulating material. In other embodiments, the insulating material 120 may be any other suitable material. The insulating material 120 may be rated for a maximum temperature of at least 1200° C. or at least 1400° C. In some embodiments, the material 120 is rated for a maximum temperature of 1600° C.

In embodiments in which the insulating material 120 is a soft insulation material, the insulating material 120 may be tightly packed in the annular space 118. In some embodiments, the insulating material 120 is held in place between the inner reaction tube 108 and the outer sleeve 106 in the absence of an adhesive or other coupling means. In other embodiments, the insulating material 120 may be coupled to the inner reaction tube 108 and/or the outer sleeve 106 by any suitable means.

The insulating material 120 may support and suspend the inner reaction tube 108 within the outer sleeve 106 and maintain the outer surface 115 of the inner reaction tube 108 approximately equidistant from the inner surface 110 of the outer sleeve 106 around the circumference of the inner reaction tube 108. The tight packing of the insulating material 120 may substantially seal the annular space 118 to prevent or restrict gas flow therethrough. The insulating material 120 may therefore help to isolate the inner reaction tube 108 and prevent oxidation.

Referring again to FIG. 1, the induction heater 104 comprises an induction coil 122 and a generator 124. The induction coil 122 is comprised of a tube or cable 123 wound into the shape of a coil. End portions 125 of the tube 123 connect the induction coil 122 to the generator 124. The tube 123 may be made of copper or any other suitable material. In some embodiments, the induction heater 104 further comprises a water cooling system (not shown) that cools the coil 122 to improve safety and performance.

The induction coil 122 is wrapped around the reactor body 102. More specifically, the induction coil 122 is wrapped around the outer surface 111 of the outer sleeve 106. In this embodiment, the induction coil 122 is approximately the same length as the inner reaction tube 108 and the induction coil 1222 and the inner reaction tube 108 are approximately longitudinally aligned. In other words, the induction coil 122 and the inner reaction tube are approximately longitudinally coterminal with one another. The inner reaction tube 108 is therefore entirely or almost entirely received within the induction coil 122. In other embodiments, the inner reaction tube may be slightly longer or shorter than the induction coil 122.

The induction heater 104 is operatively connected to a power source (not shown). In some embodiments, the power source is a low-carbon power source. As used herein "low-carbon power source" refers to a power source that produces power with substantially lower carbon dioxide emissions than conventional fossil fuel power sources. In some embodiments, the low-carbon power source comprises at least one of wind power, solar power, hydroelectric power, geothermal power, nuclear power, and combinations thereof. In other embodiments, the power source is any other suitable power source.

As one example, for a small scale or laboratory set-up, the induction heater 104 may have a maximum output power of 15 kW, single-phase 220 V input and an output frequency of 50/60 HZ. At commercial scale, the power can be in the MW range and the power can be three-phase 600 V. In other embodiments, the induction heater 104 is any other suitable heater.

The inner reaction tube 108 receives electromagnetic energy from the induction coil 122 of the induction heater 104 and converts it to heat by the eddy current energy conversion mechanism to heat the gas within the internal reaction chamber 116 to a reaction temperature. The term "reaction temperature" in this context refers to the minimum temperature at which the desired pyrolysis, reforming, or other reaction occurs. In some embodiments, the reaction temperature is at least about 1200° C. or between about 1200° C. and about 1400° C. In some embodiments, the reaction temperature is approximately 1400° C. It will be understood that any references to specific reaction temperatures herein are intended to be inclusive of minor variations as the reaction temperature may vary slightly during the reaction.

The inner reaction tube 108 is able to reach the reaction temperature relatively quickly upon activation of the induction coil 122, for example, within 1 minute or within 30 seconds. Induction heating typically has an energy conversion efficiency of between about 80% and about 90%, which is higher than other electroheating methods. This energy conversion efficiency enables the reaction temperature to reach 1200° C. to 1400° C. without a considerable energy penalty and allows the reaction to occur without use of a catalyst.

In operation, a feed gas is introduced into the feed zone 126 of the internal chamber 112 via the first end 103 of the outer sleeve 106. The feed gas flows into the internal reaction chamber 116 of the inner reaction tube 108 and is prevented from entering the annular space 118 by the insulating material 120. The feed gas flowing through the inner reaction tube 108 is heated to induce pyrolysis, reforming, or any other suitable reaction. As the induction coil 122 is aligned with the inner reaction tube 108, the feed gas only reacts as it passes through the internal reaction chamber 116 and not in the feed zone 126 or the product zone 128. The resulting reaction product mixture exits the inner reaction tube 108 into the product zone 128 towards the second end 105 of the outer sleeve 106.

As the product zone 128 is wider than the internal reaction chamber 116 (owing to the greater diameter of the outer sleeve 106 compared to the inner reaction tube 108), the product mixture will undergo volumetric expansion as it exits the free second end 109 of the inner reaction tube 108. In embodiments in which the feed gas comprises a light hydrocarbon (e.g., methane), the product mixture comprises hydrogen and elemental carbon and this volumetric expansion facilitates the separation of the solid elemental carbon from the rest of the product gases, thereby mitigating the challenges with carbon deposition observed in other reactor designs. In other embodiments, the feed gas comprises a mixture of methane and carbon dioxide and the reaction product mixture comprises syngas. It will be understood that the product mixture may also contain unreacted feed gas and, potentially, minor amounts of other intermediates or byproducts.

Therefore, embodiments of the reactor 100 are able to produce hydrogen or other fuel gases in the absence of a catalyst. As described in the Examples below, the conversion rate of the feed gas to the fuel gas of the reactor 100 very high, for example, at least 90%, at least 95%, or at least 99% conversion. The carbon intensity of the process is low and may be further reduced if low-carbon power sources are used as energy input for the induction heater.

Embodiments of the reactor 100 has a number of advantages over conventional designs. The reactor 100 allows the feed gas to be heated to the reaction temperature within a short period (e.g., within 30 seconds) without the need for pre-heating, carrier gases, or the like. This rapid heating allows fuel gas to be produced "on demand" in desired quantities. In addition, embodiments of the reactor 100 are relatively easy to assemble and compact and can readily be adapted to connect to a variety of feed gas sources. Thus, the reactor 100 is particularly suitable for use in modular systems as described below.

Figure 3A:
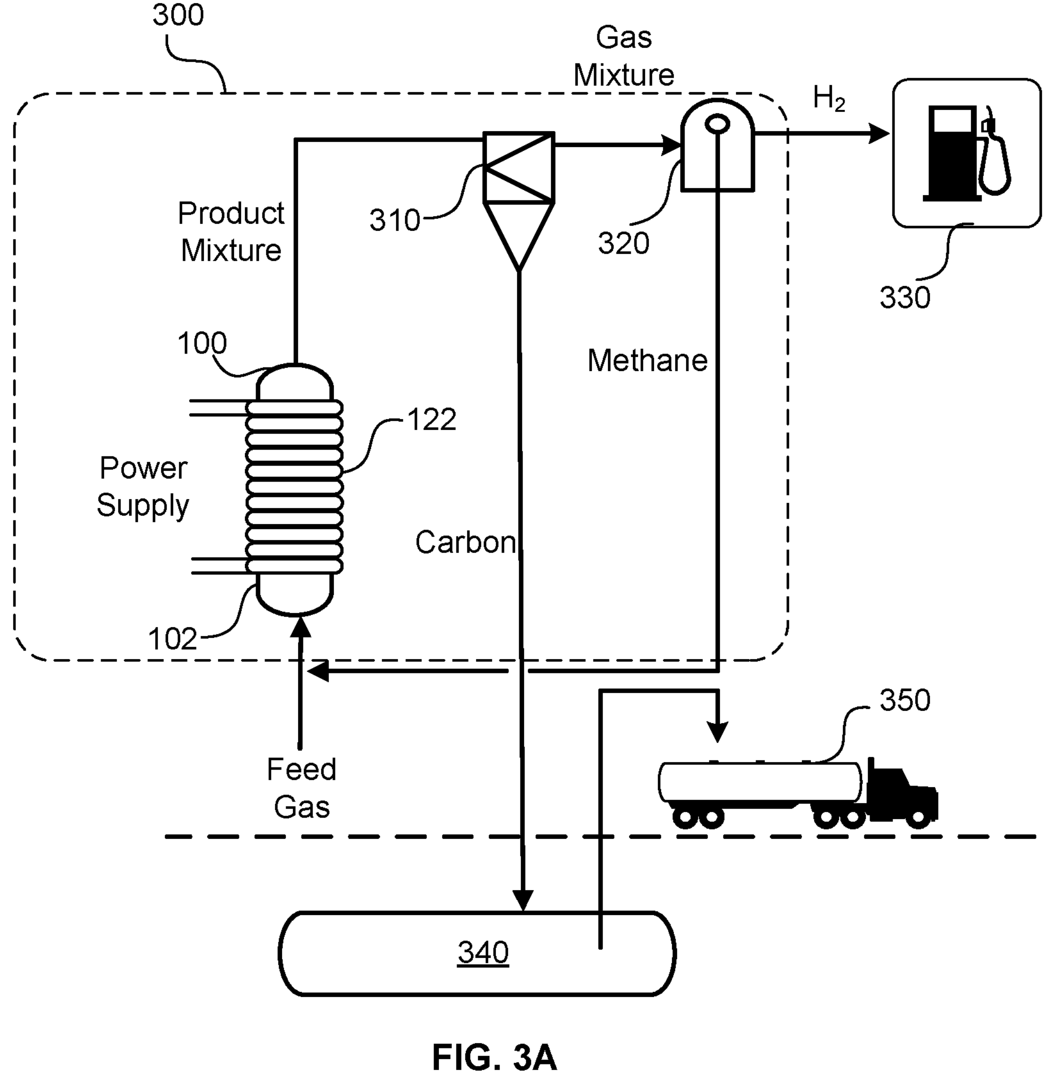
FIG. 3A is a schematic of an example system for fuel gas production, including the reactor of FIG. 1, according to some embodiments.

FIG. 3A is a schematic of an example system 300 including the reactor 100 of FIGS. 1 and 2, according to some embodiments. The system 300 in this embodiment is configured for production of hydrogen gas from natural gas (i.e., methane) via pyrolysis. However, it will be understood that the system 300 can be adapted for production other fuel gases or for other applications as needed.

In some embodiments, the system 300 is a modular system. The term "modular" in this context means that at least some components of the system (or groupings of components) are mobile and can be transported to a desired site at which they can be installed and connected to other components at the site to form the complete system. In some embodiments, the system 300 can be installed at the site of an existing fuel station such as a gas station. In other embodiments, the system 300 can be installed at any other suitable site.

The system 300 in this embodiment comprises the reactor 100, a gas-solid separator 310, and a gas separator 320.

The reactor 100 is fluidly connectable to a feed gas source (not shown). For example, the reactor 100 may be fluidly connected to a utility natural gas line or a natural gas storage container at a fuel station. In some embodiments, the reactor 100 is fluidly connected to the feed gas source via a pump or any other suitable device to convey the feed gas from the feed source to the reactor 100. In other embodiments, the feed gas may be compressed and flow of feed gas to the reactor 100 may be controlled by a valve (not shown). In yet other embodiments, the reactor 100 may receive the feed gas by any other suitable means.

The reactor 100 is also operatively connectable to a power source (not shown). In some embodiments, the power source may be a low-carbon power source, as described above, to reduce the carbon intensity of the process. The reactor 100 uses the input energy of the power source to convert the natural gas (i.e., methane) into a product mixture of hydrogen and elemental carbon. The product mixture may also contain small amounts of unreacted methane and potentially other minor natural gas components, intermediates, and/or byproducts.

In this embodiment, the gas-solid separator 310 and gas separator 320 are used to purify the hydrogen fuel gas from the product mixture. The gas-solid separator 310 is downstream and in fluid communication with the reactor 100 to receive the product mixture therefrom. The gas-solid separator 310 may comprise a cyclone, filter bags, and/or any other suitable separation device. The gas-solid separator 310 separates the product mixture into elemental carbon and a gaseous mixture of hydrogen, unreacted methane and any other minor gaseous components.

In other embodiments, the gas-solid separator 310 may be omitted for applications in which no solid products are produced. For example, the separator 310 may be omitted in embodiments of the system 300 adapted for dry methane reforming.

The gas separator 320 is downstream and in fluid communication with the gas-solid separator 310 to receive the gaseous mixture therefrom. The gas separator 320 may comprise a vacuum swing adsorption (VSA) apparatus or any other suitable device. The gas separator 320 separates the gaseous mixture into pure hydrogen ($H_2$) and the remaining gaseous components such as unreacted methane. As used herein, "pure" is intended to mean substantially pure, although minor impurities may remain. The remaining methane may be recycled back to the reactor 100 for further conversion.

In some embodiments, the system 300 further comprises a compressor (not shown). The compressor may be downstream and in fluid communication with the gas separator 320 to receive the pure hydrogen stream therefrom. The compressor may compress the hydrogen, for example, to between about 45 and about 80 MPa. In some embodiments, the system 300 further comprises a heat exchanger (not shown) to recover heat from the pure hydrogen stream. In some embodiments, the recovered heat may be used to pre-heat the feed gas before it is introduced into the reactor 100, which may reduce the power required to heat the reactor 100 to reaction temperature. The compressed (and optionally cooled) hydrogen may then be stored in a tank (not shown). The stored hydrogen may then be supplied to a fuel pump 330 to dispense the hydrogen to users. The fuel pump 330 may be part of the system 300 or may be already present on site. In other embodiments, the hydrogen may be supplied to users by any other suitable means.

The elemental carbon can be collected and stored in a storage container 340. The storage container 340 may be part of the system 300 or may be a component of the site at which the system 300 is installed. In some embodiments, the storage container 340 is underground. The stored carbon may then be transported off site for further purification and/or use. The carbon may be transported by a truck 350 or any other suitable transportation means.

In some embodiments, multiple systems 300 may be provided on the same site to increase the amount of available hydrogen. Each system 300 may be completely separate or two or more systems 300 may share certain components. For example, all systems 300 may be connected to the same storage container 340 for the produced carbon.

Figure 3B:
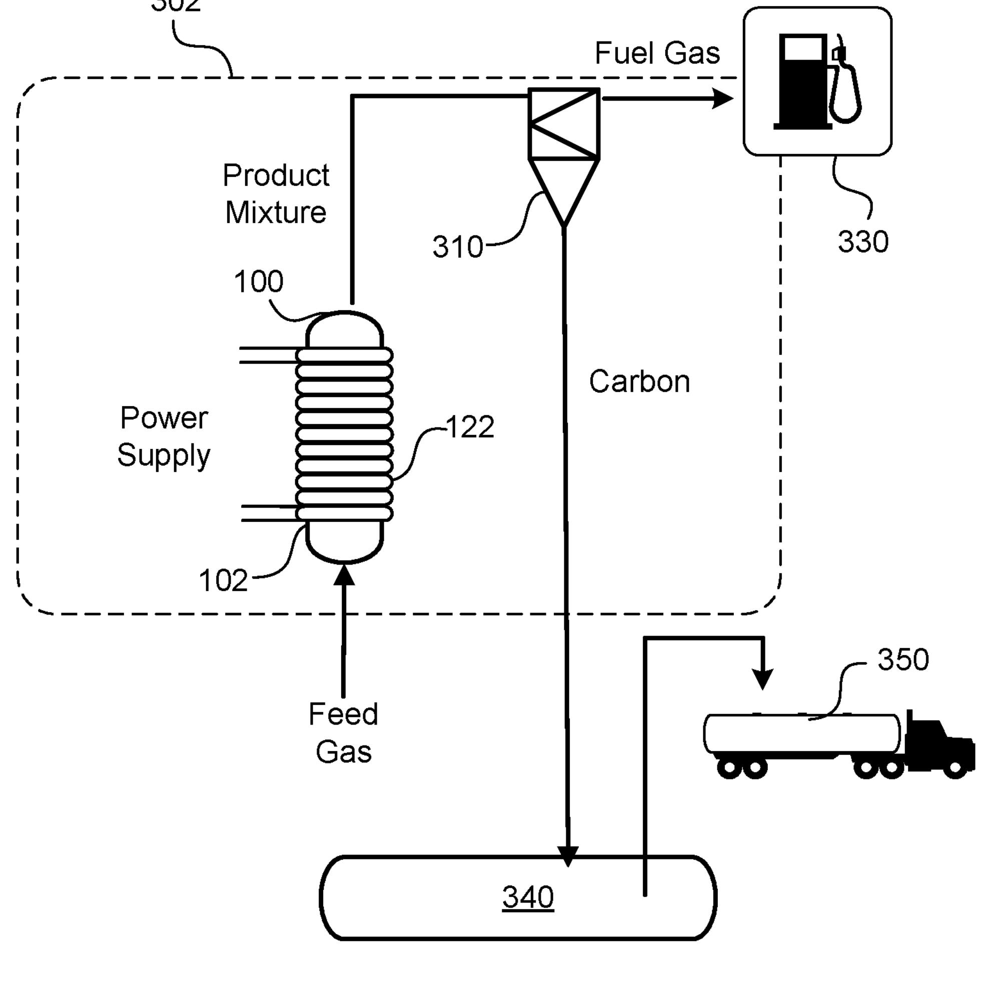
FIG. 3B is a schematic of another example system for fuel gas production, including the reactor of FIG. 1, according to some embodiments.

FIG. 3B is a schematic of an alternative system 302 including the reactor 100 of FIGS. 1 and 2, according to some embodiments. The system 300 in this embodiment is configured for production of hydrogen gas from natural gas (i.e., methane) via pyrolysis. However, it will be understood that the system 302 can be adapted for production other fuel gases or for other applications as needed.

The system 302 is similar to the system 300 and like reference numbers indicate like elements. Compared to the system 300, the system 302 does not have the gas separator 320. As discussed in the Examples below, the conversion of feed gas to fuel gas in the reactor 100 can be close to 100% (or at 100%) and, thus, gas separation may be omitted in some embodiments. The system 300 may otherwise function in a similar manner to the system 300 as described above.

Therefore, the systems 300 and 302 may decentralize hydrogen production and require lower capital and operating costs compared to conventional centralized facilities. The ability to install the system 300/302 directly on-site may also reduce the challenges associated with transportation of hydrogen, including eliminating the need for ammonia as a hydrogen carrier. The modular nature of the system 300/302 also enables deployment of the technology in remote areas and can use existing natural gas infrastructure so it can be deployed quickly. In addition, the system 300/302 does not require CO2 capture or storage technologies and the elemental carbon produced as a byproduct can be used or sold for other applications.

Figure 4:
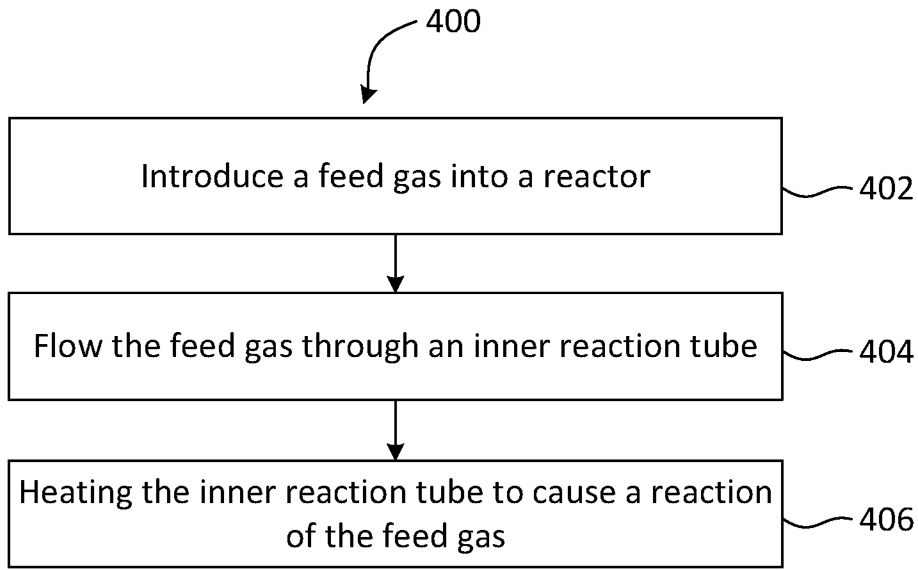
FIG. 4 is a flowchart of a method for fuel gas production, according to some embodiments.

FIG. 4 is a flowchart of a method 400 for producing a fuel gas, according to some embodiments. The implementation of the method 400 will be discussed with reference to the reactor 100 of FIGS. 1 and 2; however, it will be understood that the method 400 can be implemented using any reactor embodiment disclosed herein.

At block 402, a feed gas is introduced into the reactor 100. As used herein, "introduce" refers to any means by which the feed gas can enter the reactor 100, including pumping, feeding, or flowing the feed gas into the reactor 100 or drawing the feed gas through the reactor 100. The feed gas may comprise a light hydrocarbon, a mixture of methane and carbon dioxide, or any other suitable feed gas. In this embodiment, the feed gas is introduced into the feed zone 126 of the internal chamber 112 via the first end 103 of the outer sleeve 106.

In some embodiments, the feed gas is introduced into the reactor 100 continuously, for example, when a continuous supply of feed gas is desired. In other embodiments, a specific volume of feed gas may be introduced into the reactor 100, for example, when only a specific volume of fuel gas is required (e.g., "on demand").

At block 404, the feed gas flows through the inner reaction tube 108. The flow rate may be any suitable flow rate based on the size of the reactor 100. For example, in a small scale or laboratory scale set-up, the flow rate of the feed gas may be at least about 0.01 kmol/h or between about 0.01 and about 0.02 kmol/h. As one specific example, the flow rate may be 0.017 kmol/h. As another example, in a commercial scale set-up, the flow rate may be in the range of 5 to 15 kg/hr, 8 to 12 kg/hr, or approximately 10 kg/hr. In other embodiments, the flow rate may be any other suitable flow rate. The flow rate may be selected based on experimental data and/or simulation results in some embodiments.

At block 406, the inner reaction tube 108 is heated to cause a reaction of the feed gas as it is flowing therethrough. The inner reaction tube 108 may be heated to between about 1200° C. and about 1400° C. or to any other suitable temperature to cause a desired reaction of the feed gas. As discussed above, the inner reaction tube 108 is heated by powering the induction heater 104 which provides electromagnetic energy to the inner reaction tube 108 via the induction coil 122. The induction heater 104 may be powered by a low-carbon power source or any other suitable power source. The input power may be any suitable power to achieve the desired reaction temperature. See Example 2 below with example input power for different scales of reactors. The input power may be selected based on experimental data and/or simulation results.

In some embodiments, the method 400 may further comprise collecting a reaction product mixture. The reaction product mixture may initially collect in the product zone 128 of the internal chamber 112 and may be released from the reactor 100 via one or more outlets. In embodiments in which the feed gas comprises a light hydrocarbon, the product mixture comprises hydrogen gas and elemental carbon. In embodiments in which the feed gas is methane and carbon dioxide, the product mixture comprises syngas. The product mixture may also contain small amounts of unreacted feed gas and/or other intermediates, byproducts, etc.

In some embodiments, the method 400 may further comprise separating the product mixture to obtain a pure fuel gas. In some embodiments, the product mixture may be separated in two or more stages. In some embodiments, the product mixture may be subjected to a gas-solid separation step to separate a gaseous mixture from a solid byproduct. For example, a gaseous mixture of hydrogen and unreacted feed gas may be separated from solid elemental carbon. This step may be performed using the gas-solid separator 310 of the system 300 or any other suitable separator.

The gaseous mixture may then be subjected to a gas separation step to separate pure fuel gas from unreacted feed gas. For example, pure hydrogen gas may be separated from unreacted natural gas/methane or other light hydrocarbon feed gases. This step may be performed using the gas separator 320 of the system 300 or any other suitable separator.

In embodiments in which the feed gas is a methane and carbon dioxide and the fuel gas is syngas, the gas-solid separation step may be omitted and only the gas separation step may be performed to separate syngas from unreacted methane and carbon dioxide.

In yet other embodiments, the gas separation step may be omitted, for example, when the conversion of feed gas to fuel gas is close to 100% and there is little to no unreacted feed gas to remove.

Optionally, the method 400 may further comprise recycling unreacted feed gas back into the reactor 100. The recycled unreacted feed gas may be combined with fresh feed gas and the method 400 may start again at block 402.

In some embodiments, the pure fuel gas may be used immediately by a consumer. In other embodiments, the pure fuel gas is stored prior to use. In some embodiments, the fuel gas is compressed prior to storage.

In some embodiments, the pure fuel gas is cooled, before or after compression. In some embodiments, the pure fuel gas is cooled by passage through a heat exchanger to recover at least some of the heat. Optionally, the feed gas may also be passed through the same heat exchanger prior to block 402 to pre-heat the fuel gas. Although pre-heating the feed gas is not required for the reaction, it may reduce the power needed for the reactor 100 to reach reaction temperature.

Therefore, embodiments of the method 400 allow feed gases to efficiently be converted to fuel gases without a catalyst. Embodiments of the method 400 also do not require any pre-processing of the feed gas such as addition of a carrier gas. As discussed above, the reactor 100 and method 400 are particularly suited for modular, on-site applications.

Without any limitation to the foregoing, the reactors and methods disclosed above are further described by way of the following examples.

EXAMPLE 1—HYDROGEN PRODUCTION EXPERIMENTS

Example 1.1—Initial Experiments with Nickel Reaction Tube

Initial experiments were performed using a reactor comprising a nickel reaction tube and an induction heater. The induction heater included an induction coil and generator. The induction heating unit power was 15 kW, and it had an input single-phase 220 V and 50/60 HZ frequency. It used water cooling to keep the induction coil safe and improve performance. The induction coil was directly wrapped around the nickel reaction tube in the absence of an outer sleeve.

These experiments were performed with methane as the feed gas and the reaction tube was heated to 1400° C. to pyrolyze the methane to hydrogen and elemental carbon. The results of the experiments are shown in Table 1. As can be seen from the results, a partial thermal cracking was observed, and the presence of carbon monoxide (CO) in the products indicates the permeation of oxygen inside the reactor. Since there is no air or oxygen flow into the reactor, it was surprising to see CO as one of the products. The most likely explanation for the source of the oxygen within the reactor is the permeation of oxygen from the nickel pipe at elevated temperatures. At high temperatures, many nickel-based alloys show dramatic reduction in tensile ductility in the range 700-900° C. after short exposures in the air and at about 1000° C. and at such an elevated temperature, it tends to have an intergranular oxygen diffusivity.

TABLE 1

Experimental Results with Nickel Reaction Tube

| Flow (ml/min) | Power (W) | H2 | CH4 | CO |
|---|---|---|---|---|
| 3 | 5824 | 39 | 32 | 28 |
| 3 | 6656 | 49 | 10 | 39 |
| 10 | 4576 | 17 | 74 | 8 |
| 5 | 5200 | 35 | 44 | 19 |
| 20 | 3952 | 10 | 85 | 4 |

Following the failure of the experiment using the nickel reaction tube, the reaction tube was replaced with tantalum. Tantalum is known for its use at high-temperature operations. After executing an experiment, it was observed the tantalum is oxidized at 1000° C. As a result, two other alternative reactor designs were tested, as described in more detail below.

Example 1.2—Reactor Design #1

Figure 5:
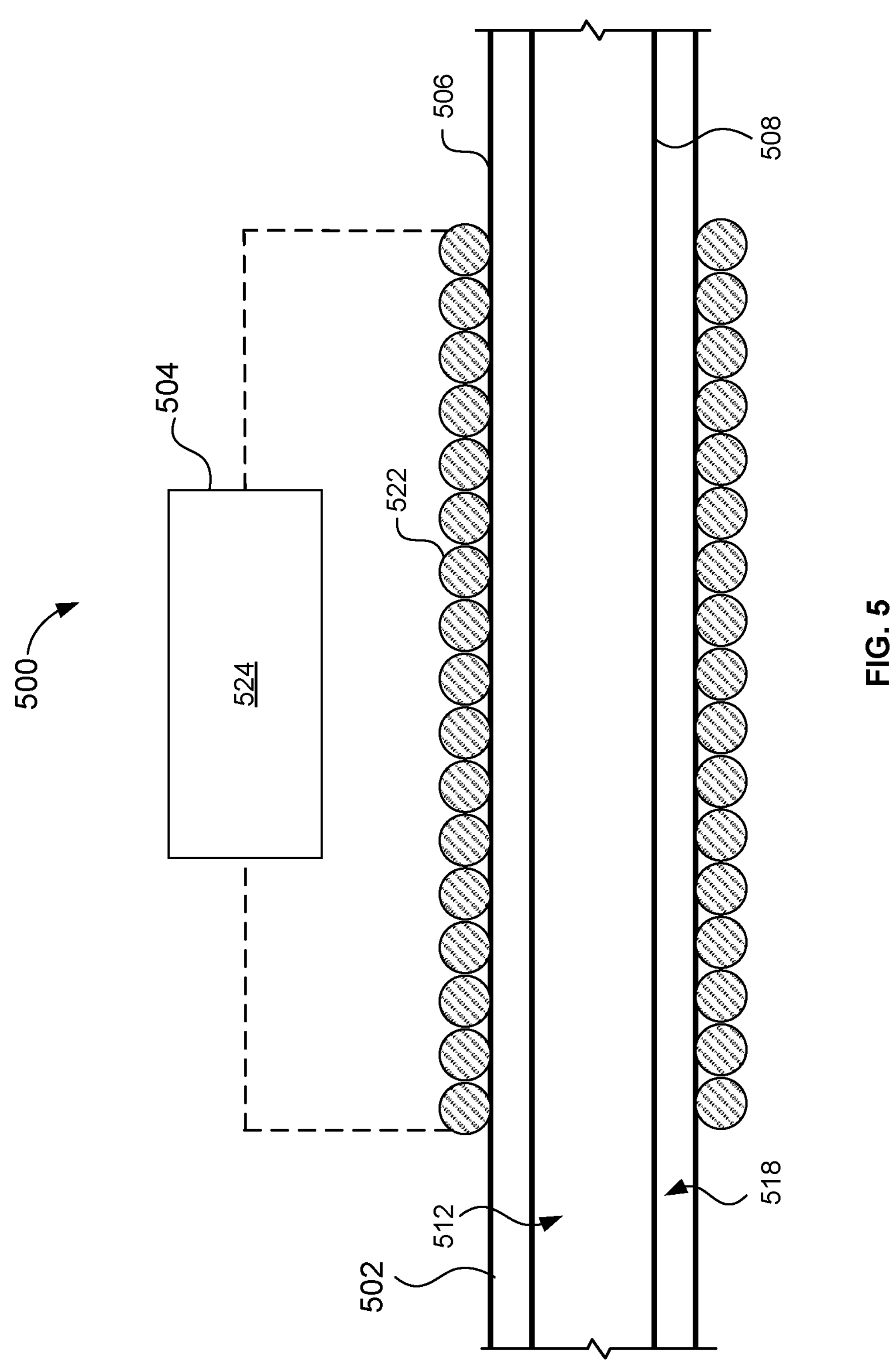
FIG. 5 is a partial, cross-sectional view of an alternative reactor design used in initial experiments.

The first alternative reactor design is shown in FIG. 5. The reactor 500 includes a reactor body 502 and an electromagnetic induction heater 504. The induction heater 504 is the same unit used in the nickel reaction tube experiments described above. The heater 504 includes an induction coil 522 and generator 524. The induction coil 522 is wrapped around the reactor body 502.

The reactor body 502 comprises an outer sleeve 506 and an inner reaction tube 508 with an annular gap 518 therebetween. The inner reaction tube 508 is coaxial with the outer sleeve 506 and extends approximately the same longitudinal length as the outer sleeve 506. The outer sleeve 506 is quartz and the inner reaction tube 508 is tantalum. A vacuum was applied in the annular gap 518 to isolate the tantalum from exposure to oxygen in the atmosphere. In this design, elemental carbon and product gasses travel along the tube, which was found to raise challenges associated with carbon deposition in the inner reaction tube 508 and affecting the gas velocity and reaction kinetics.

Example 1.3—Reactor Design #2

As a result of the challenges with Reactor Design #1, a second design was developed, which is more suitable for quenching the reaction products and separating the solid products from the product gases. Reactor Design #2 is the design depicted in FIGS. 1 and 2 and described above (with the inner reaction tube 108 comprised of tantalum).

Example 1.4—Experimental Results With Reactor Designs #1 and #2

Experiments were conducted using methane, propane, or butane as the feed gas and the reactors were heated to 1400° C. to pyrolyze the feed gas to hydrogen and elemental carbon. As shown in Table 2 below, Reactor Design #2 yielded the best results. The conversion rate of methane to hydrogen for Reactor Design #2 was above 99% and, in one measurement, it was 100%.

TABLE 2

Experimental Results with Two Reactor Designs

| Reactor | Gas | Flow (ml/min) | Power (W) | H2 | CH4 | CO |
|---|---|---|---|---|---|---|
| 1 | Methane | 10 | 1331.2 | 97 | 1.3 | 1.4 |
| 1 | Methane | 20 | 1580.8 | 88 | 11 | 0.6 |
| 1 | Methane | 20 | 2038.4 | 94 | 5 | 0.8 |
| 1 | Methane | 20 | 2246.4 | 96 | 2.5 | 1 |
| 1 | Methane | 30 | 2246.4 | 96 | 3 | 0.6 |
| 2 | Methane | 50 | 2246.4 | 100 | 0 | 0 |
| 2 | Methane | 60 | 2246.4 | 99.5 | 0.4 | 0 |
| 2 | Propane | 20 | 2246.4 | 96.8 | | 3.17 |
| 2 | Propane | 20 | 2246.4 | 96.8 | 2.4 | 0.8 |
| 2 | Butane | 20 | 2246.4 | 97 | 2 | |
| 2 | Butane | 20 | 2246.4 | 97 | 2 | |

Conclusions

Reactor Design #2 (which corresponds to reactor 100 in FIGS. 1 and 2) provided the highest conversion rate of any of the reactors tested and did not have any oxidation issues as with earlier designs. Moreover, the volumetric expansion of the product mixture exiting the inner reaction tube allowed the solid elemental carbon to separate from the rest of the product gasses, thereby mitigating carbon deposition issues.

EXAMPLE 2—INPUTS AND OUTPUTS OF EXAMPLE SYSTEMS

Figure 6:
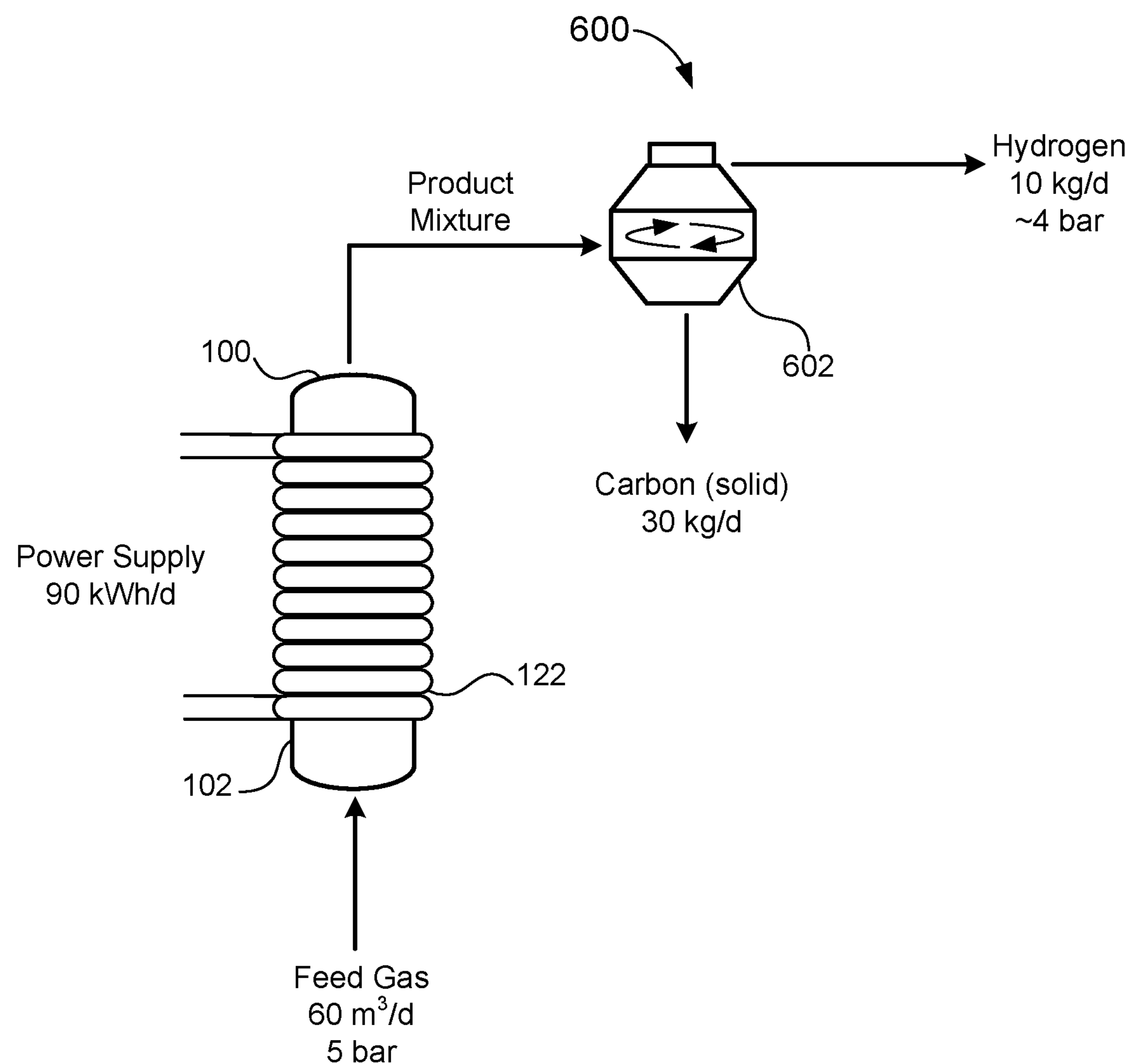
FIG. 6 is a schematic of an example laboratory-scale system, with inputs and outputs indicated.

FIG. 6 is a schematic of an example small-scale or laboratory scale system 600 including the reactor 100 of FIGS. 1 and 2. The system 600 also comprises a cyclonic separator 602. The system 600 is representative of the system used in the experiments of Example 1 with Reactor Design #2.

The inputs of the system 600 are the feed gas (e.g., natural gas) and power to the induction coil 122 of the reactor. In this example, the flow rate of the feed gas is 60 $m^3$/day at a pressure of 5 bar and the power supply to the induction coil 122 is 90 kWh/day (to achieve a reaction temperature of 1400° C.). The power supply may be lower in other examples if heat is recovered, as discussed below with respect to the commercial-scale system.

The cyclonic separator 602 receives a product mixture from the reactor 100 and separates the product mixture into hydrogen and solid carbon. The hydrogen and carbon and thus the outputs of the system 600. In this example, hydrogen is produced at 10 kg/day at a pressure of around 4 bar and carbon is produced at a rate of about 30 kg/day.

Figure 7:
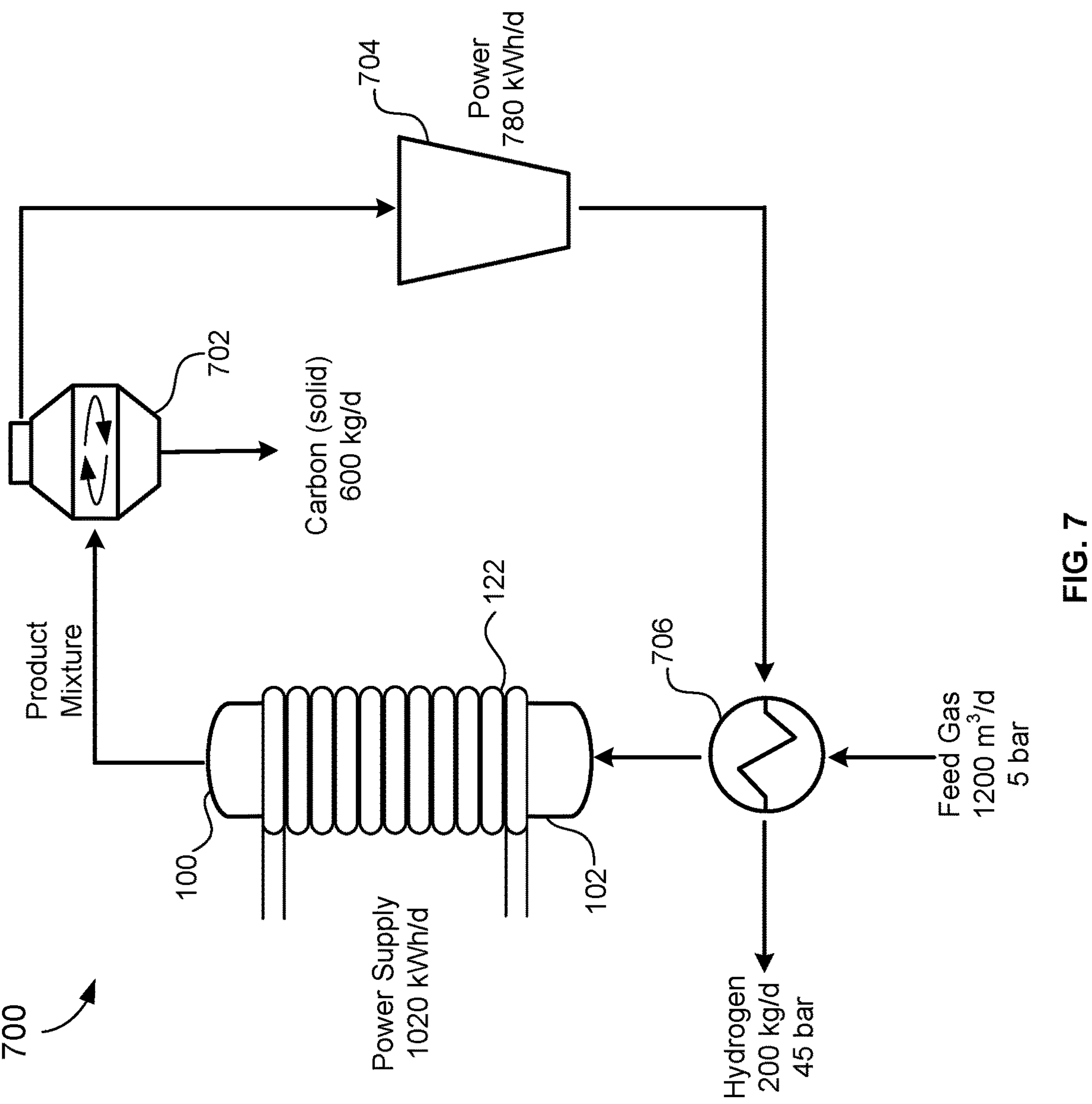
FIG. 7 is a schematic of an example commercial-scale system with inputs and outputs indicated.

FIG. 7 a schematic of an example commercial-scale system 700 including the reactor 100 of FIGS. 1 and 2. The system 700 also comprises a cyclonic separator 702, a compressor 704, and a heat exchanger 706.

The inputs of the system 700 are the feed gas (e.g., natural gas), power to the induction coil 122 of the reactor 100, and power to the compressor 704. In this example, the flow rate of the feed gas is 1200 $m^3$/day at 5 bar and the power supply to the induction coil 122 is 1020 kWh/day (to achieve a reaction temperature of 1400° C.). The power supply to the compressor 704 is 780 kWh/day.

The cyclonic separator 702 receives a product mixture from the reactor 100 and separates the product mixture into hydrogen and solid carbon. The hydrogen is then compressed by the compressor 704 and cooled by the heat exchanger 706 (which also heats the feed gas prior to its introduction into the reactor 100). The outputs of the system 700 are thus hydrogen (cooled and compressed) and solid carbon. In this example, hydrogen is produced at a rate of about 200 kg/day at a pressure of 45 bar and carbon is produced at a rate of about 600 kg/day. Recovery of heat from the hydrogen stream via the heat exchanger 706 helps to reduce the power input to the reactor 100.

It will be understood that the inputs and outputs of the systems 600 and 700 are examples only and embodiments are not limited to the specific flow rates, pressure, or power disclosed herein. Many other variations are possible and the flow rate and power supply can be adjusted based on the size of the reactor, the desired reaction temperature, the desired product output, etc.

EXAMPLE 3—PROCESS SIMULATION OF HYDROGEN PRODUCTION

Following the experiments of Example 1, the experimental results were fed into a process simulator to evaluate the process's carbon footprint and energy intensity. Below is a summary of the process simulation.

Example 3.1—Simulation Using Aspen

A preliminary techno-economic parametric study was conducted on the experimental thermal methane pyrolysis process in Example 1 (at laboratory-scale). Firstly, a process simulation using Aspen Plus® for the thermal methane pyrolysis process was performed with detailed reaction kinetics under various technical parameters of the reaction such as temperature and energy input. Based on the technical performance from the process simulation, yields of $H_2$ and C, and the amount of fuel required to supply heat to the reactor are obtained, and then, economic feasibility in terms of unit $H_2$ production cost was reported.

Figure 8:
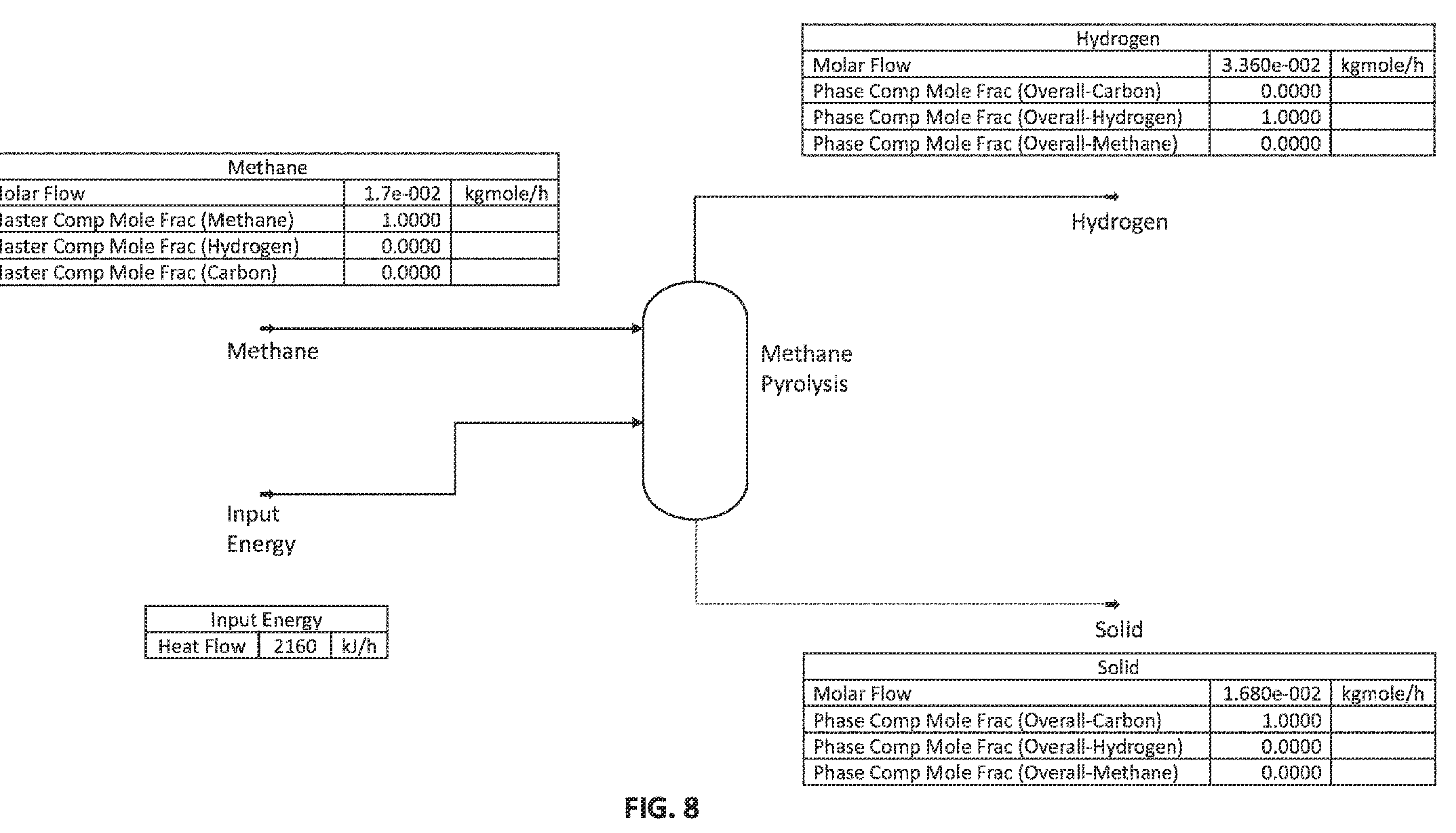
FIG. 8 is a process flow diagram of a simulation study of methane pyrolysis at different input energy ranges.
Figure 9A:
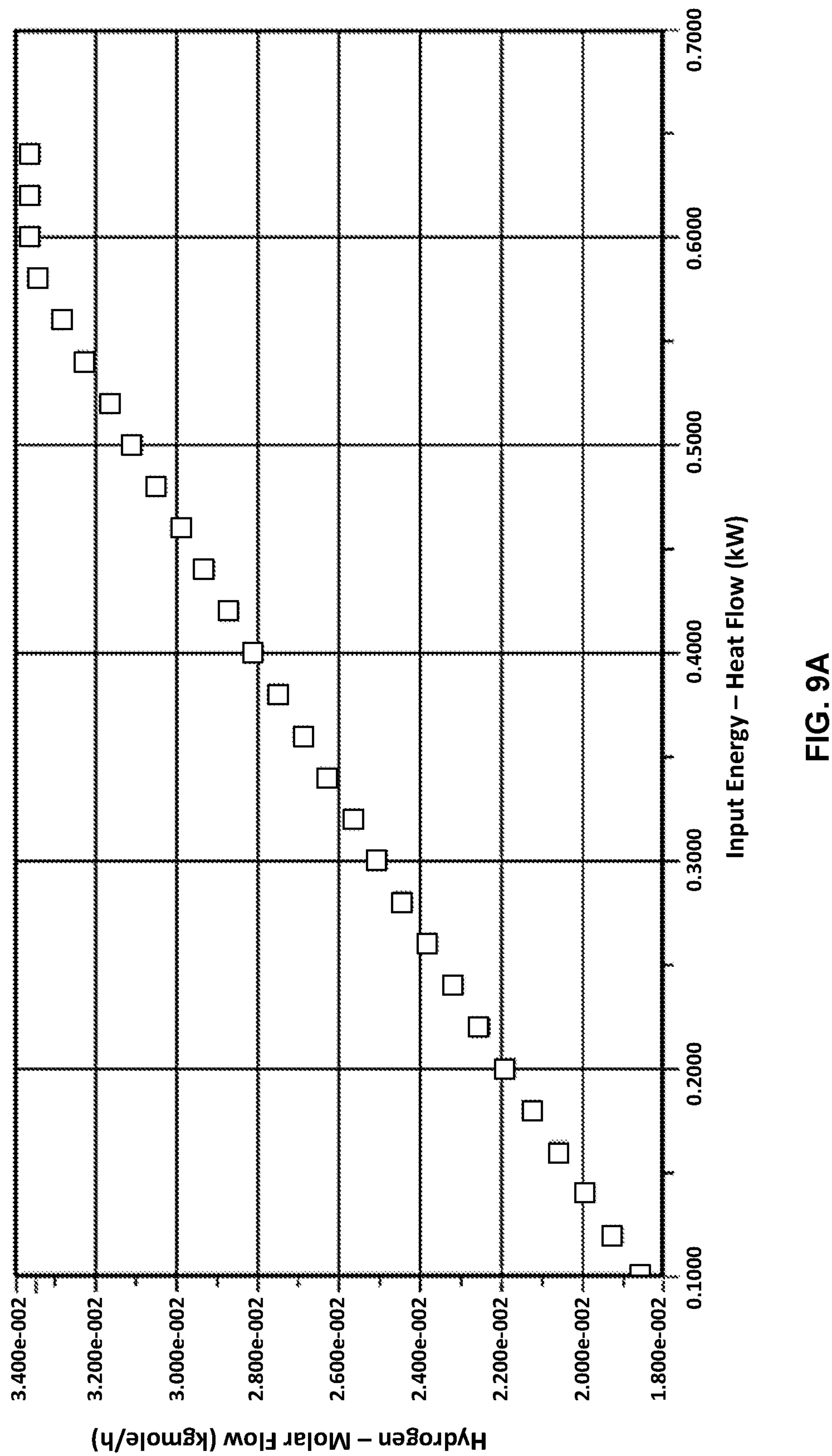
FIGS. 9A and 9B are graphs of the results of the simulation of FIG. 6 showing hydrogen flow and conversion efficiency versus input energy, respectively.
Figure 9B:
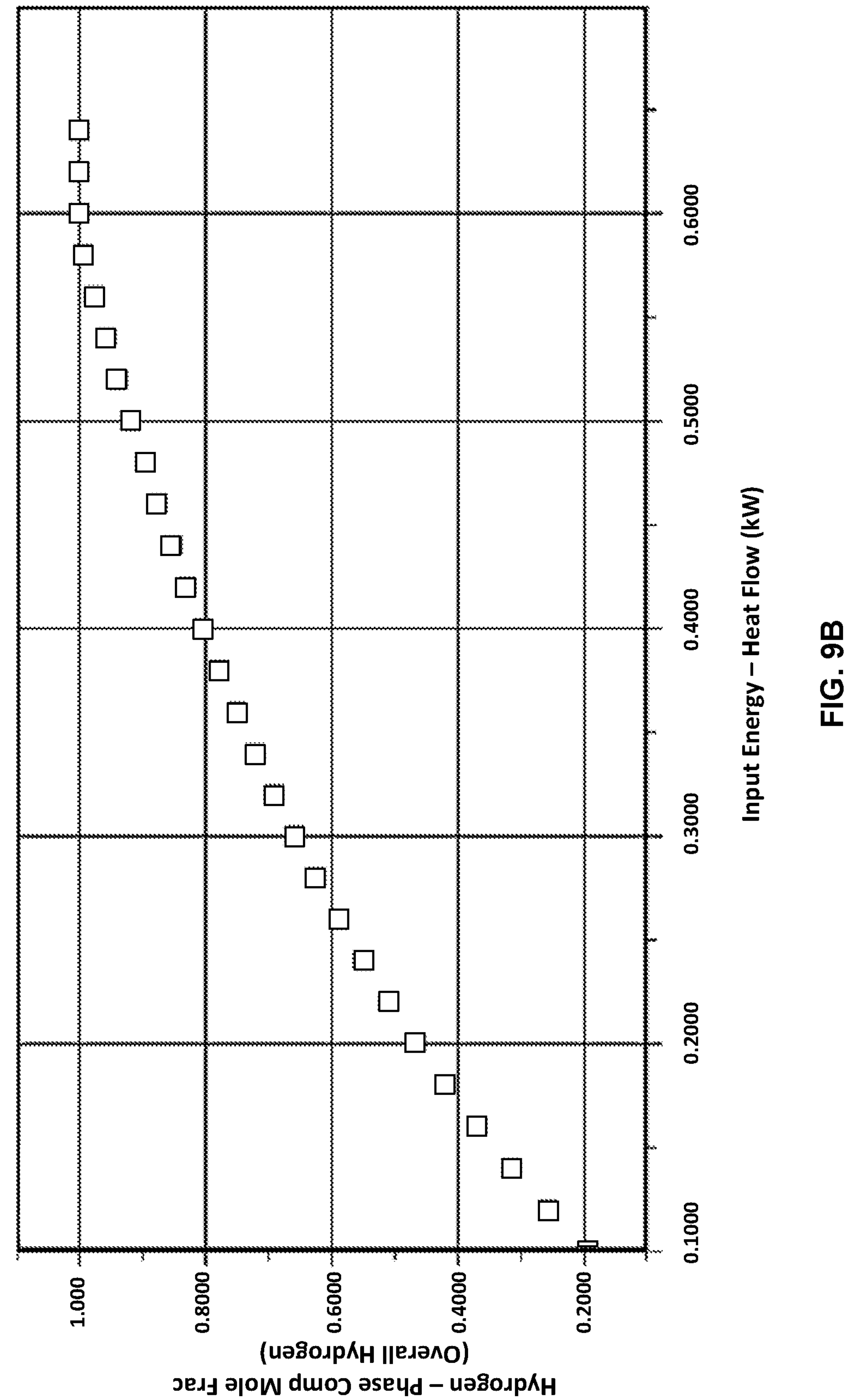

A comparative study showed the cost competitiveness of the experimental process compared to the conventional $H_2$ production methods of SMR (steam methane reforming) and SMR with CCS (carbon capture and storage). FIG. 8 shows the process flow diagram of the thermal methane pyrolysis, where $CH_4$ enters the validated reactor at the different input energy ranges. FIGS. 9A and 9B show the simulation results for calculating hydrogen flow and conversion efficiency versus input energy, respectively. A summary of the energy intensity calculation is shown in Table 3:

TABLE 3

Energy Intensity Calculations

| Flow Rate (Kmol/h) | Flow Rate (mol/s) | Efficiency | Produced H2 (mol/s) | Produced H2 (g/s) | Heat of Combustion |
|---|---|---|---|---|---|
| 0.0168 | 0.004666667 | 0.99 | 0.00924 | 0.01848 | 141.08 |
| **Required H2 to produce 1 Mj (g)** | **Time to produce 7 g of H2 (S)** | **Heater power consumption** | **Energy to produce 7 g H2 (Kwh)** | **Alberta CO2e/kwh** | **Produced CO2** |
| 7.088176921 | 383.5593572 | 0.6 | 0.06392656 | 429 | 27.424494 |

The results of the process simulation indicated that input power (i.e., reaction temperature) appears to be an important process variable for determining the technical performance. Methane pyrolysis demonstrated the maximum net $H_2$ and C production at 0.6 kW when the methane was flowing at a rate of 1.7 $e^{-2}$ kmol/h.

It has been reported that the plasma-based system using electricity from renewable sources shows the lowest emissions of 43 $gCO_2$ $MJ^{-1}$, and the molten metal and the thermal gas system shows relatively higher GHG emissions due to the additional combustion and natural gas supply chain. As per measured lab data and modeling simulation, the carbon intensity of this process for hydrogen is 27.4 CO2e/MJ and this calculation is based on the assumption of using grid electricity from Alberta, Canada. This number will be lower if renewable electricity is used for the process.

The cost estimation for each methane pyrolysis production method such as SMR (USD 0.94-1.78/kg $H_2$) and SMR with CCS (USD 1.45-2.38/kg $H_2$) indicates that the experimental process is not only less carbon intensive but also is cheaper ($0.6/kg $H_2$) than conventional processes.

EXAMPLE 4—DRY METHANE REFORMING EXPERIMENTS

After successful demonstration of the reactor for hydrogen production, the same set up and design (i.e., Reactor Design #2) was used to assess feasibility of a dry methane reforming process. A mixture of 50% methane and 50% $CO_2$ gasses was injected into the reactor with 50 sccm flow rate at similar temperature and pressure. The results showed 99% conversion rate of the gas mixture to syngas (53.3% H2+45.8% CO). This result confirms that the current reactors and methods are not only applicable for hydrogen production from light hydrocarbons but can also be used for a dry methane reforming process for producing syngas.

Although particular embodiments have been shown and described, it will be appreciated by those skilled in the art that various changes and modifications might be made without departing from the scope of the disclosure. The terms and expressions used in the preceding specification have been used herein as terms of description and not of limitation, and there is no intention in the use of such terms and expressions of excluding equivalents of the features shown and described or portions thereof. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A reactor for producing a fuel gas, comprising:
- an outer sleeve having a first end and a second end, the outer sleeve defining an internal chamber therein;
- an inner reaction tube disposed within the internal chamber, the inner reaction tube being shorter than the outer sleeve and longitudinally recessed within the internal chamber from the first end and the second end of the outer sleeve, wherein the inner reaction tube and the outer sleeve define an annular space therebetween;
- an insulating material disposed within the annular space, wherein the insulating material substantially seals the annular space from gas flow; and
- an induction heater comprising an induction coil, the induction coil wrapped around the outer sleeve, wherein the induction coil is approximately the same length as the inner reaction tube and longitudinally aligned with the inner reaction tube.

2. The reactor of claim 1, wherein the inner reaction tube is coaxial with the outer sleeve.

3. The reactor of claim 1, wherein the first end is an inlet end and the second end is an outlet end, and wherein the internal chamber defines a feed zone between the inlet end and the inner reaction tube, and a product zone between the inner reaction tube and the outlet end.

4. The reactor of claim 1, wherein the insulating material comprises alumina paper, ceramic wool, high temperature insulation board, or microporous silica-based insulating material.

5. The reactor of claim 1, wherein the outer sleeve is comprised of quartz.

6. The reactor of claim 1, wherein the inner reaction tube is comprised of graphite or tantalum.

7. The reactor of claim 1, wherein the reactor is horizontally oriented.

8. A system comprising:
- a reactor to convert a feed gas to a fuel gas, the reactor comprising:
  - an outer sleeve having a first end and a second end, the outer sleeve defining an internal chamber therein;
  - an inner reaction tube disposed within the internal chamber, the inner reaction tube being shorter than the outer sleeve and longitudinally recessed within the internal chamber from the first end and the second end of the outer sleeve, wherein the inner reaction tube and the outer sleeve define an annular space therebetween;
  - an insulating material disposed within the annular space, wherein the insulating material substantially seals the annular space from gas flow; and
  - an induction heater comprising an induction coil, the induction coil wrapped around the outer sleeve, wherein the induction coil is approximately the same length as the inner reaction tube and longitudinally aligned with the inner reaction tube;
- at least one of a gas-solid separator and a gas separator to purify the fuel gas; and
- wherein the system is modular and can be transported and installed on site.

9. The system of claim 8, wherein the reactor is fluidly connectable to a utility natural gas line or a natural gas storage container.

10. The system of claim 8, wherein the reactor is operatively connectable to a low-carbon power source.

11. The system of claim 8, further comprising a fuel pump to dispense the fuel gas.

12. The system of claim 8, further comprising a compressor to compress the fuel gas.

13. The system of claim 8, further comprising a heat exchanger to recover heat from the fuel gas.

14. A method comprising:
- introducing a feed gas into a reactor, the reactor comprising:
  - an outer sleeve having a first end and a second end, the outer sleeve defining an internal chamber therein;
  - an inner reaction tube disposed within the internal chamber, the inner reaction tube being shorter than the outer sleeve and longitudinally recessed within the internal chamber from the first end and the second end of the outer sleeve, wherein the inner reaction tube and the outer sleeve define an annular space therebetween;
  - an insulating material disposed within the annular space, wherein the insulating material substantially seals the annular space from gas flow; and
  - an induction heater comprising an induction coil, the induction coil wrapped around the outer sleeve, wherein the induction coil is approximately the same length as the inner reaction tube and longitudinally aligned with the inner reaction tube;
- flowing the feed gas through the inner reaction tube; and
- heating, via the induction heater, the inner reaction tube to a temperature to cause a reaction of the feed gas.

15. The method of claim 14, further comprising collecting a reaction product mixture.

16. The method of claim 15, wherein the feed gas comprises a light hydrocarbon and the reaction product mixture comprises hydrogen and elemental carbon.

17. The method of claim 15, wherein the feed gas comprises methane and carbon dioxide and the reaction product mixture comprises syngas.

18. The method of claim 17, wherein the feed gas comprises about 50% methane and about 50% carbon dioxide.

19. The method of claim 14, wherein the inner reaction tube is heated to between about 1200° C. and about 1400° C.

* * * * *